H. ROGERS.
METHOD FOR PRODUCTION OF DIPHENYLAMINE.
APPLICATION FILED JULY 16, 1917.
1,314,538.
Patented Sept. 2, 1919.
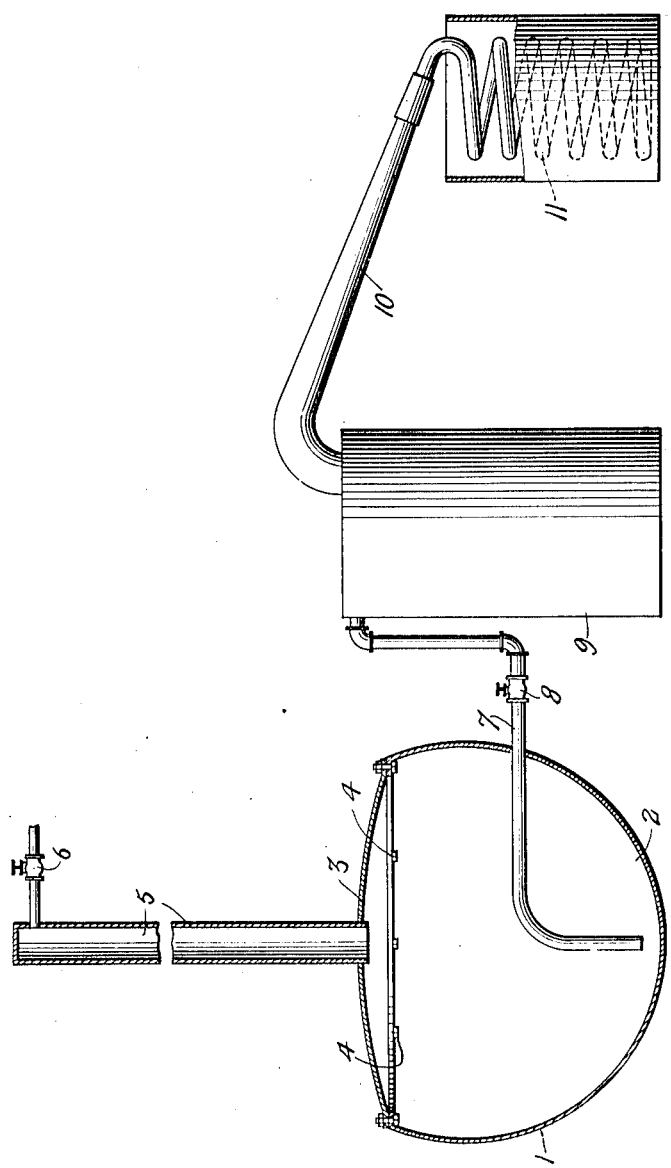
INVENTOR
Homer Rogers
BY
Prindle, Wright & Small
ATTORNEY

UNITED STATES PATENT OFFICE.

HOMER ROGERS, OF WILMINGTON, DELAWARE, ASSIGNOR TO E. I. du PONT de NEMOURS AND COMPANY, OF WILMINGTON, DELAWARE, A CORPORATION OF DELAWARE.

METHOD FOR PRODUCTION OF DIPHENYLAMINE.

1,314,538.  Specification of Letters Patent.  Patented Sept. 2, 1919.

Application filed July 16, 1917. Serial No. 180,720.

*To all whom it may concern:*

Be it known that I, HOMER ROGERS, of Wilmington, in the county of New Castle and in the State of Delaware, have invented a certain new and useful Improvement in Methods for Production of Diphenylamine, and do hereby declare that the following is a full, clear, and exact description thereof.

My invention relates particularly to a process of producing diphenylamine by the action of a catalyst upon aniline, and similar reactions.

The object of my invention is to provide a process for producing diphenylamine by the treatment of aniline with bromine or a bromide.

The object of my invention is to insure the production of the diphenylamine by controlling the conditions of the process, particularly the presence of water.

While my invention is capable of being carried out in many different ways, for the purpose of illustration, I shall describe only certain ways of carrying out the same, and while my invention is capable of being carried out in connection with many different forms of apparatus, I will describe only one form of apparatus to be used in connection with carrying out my invention, in the accompanying drawings, in which, The figure is a vertical section of an apparatus which may be used in connection with my invention.

In the drawings I have shown an autoclave 1, comprising a container 2, which may be made of iron, to which there is adapted to be attached a lid 3, which may also be made of iron and which may be attached to the container 2 by means of bolts 4. On the lid 3 there is, furthermore, provided a column 5, having a valved outlet pipe 6, at its upper end. The autoclave may have an outlet pipe 7 having a hand valve 8 leading to a still 9 of any suitable character, having a vapor outlet pipe 10 leading to a condenser 11.

I may for example carry out my invention as follows:

A quantity of aniline mixed with a small percentage of a catalyst, as, for example, ammonium bromide, the catalyst, however, preferably being about 1% of the aniline, is inserted in the autoclave 1 and the cover 3 tightly secured to the same. Heat is now applied to the autoclave and the contents are subjected to heat in this manner for any suitable length of time, but preferably 48 hours. The aniline is transformed into diphenylamine, in accordance with the following equation:

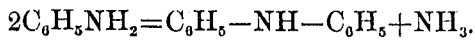

$$2C_6H_5NH_2 = C_6H_5-NH-C_6H_5 + NH_3.$$

By providing the column 5 and the valved outlet pipe 6, I am enabled to release by means of said pipe 6 the ammonia, which accumulates from time to time without losing the aniline, as the column 5 has the effect of condensing the aniline and returning the same to the container 2 under the cooling effect of the air, while the ammonia accumulates in the top of the column 5. In this way the reaction may be carried more nearly to completion, owing to the fact that the ammonia produced in the process is removed from the presence of the aniline and the pressure in the autoclave is materially reduced.

With the percentage of the bromine catalyst less than 0.5%, the reaction takes place very slowly, and, therefore, requires heating for a long period of time, thus increasing the cost of operation. With amounts of the catalyst greater than 3% the ratio of condensation is increased to some extent, but this is offset by the greater loss of material, due to the increased formation of tar.

I have found, furthermore, that the temperature used should be about 300° C., although temperatures from 275 to 325° C. may be used, as at lower temperatures the rate of formation is very slow and at higher temperatures the formation of tar is increased.

The catalyst used may be bromine, but preferably instead of bromine I use a compound containing bromine, as for example, aniline, hydrobromide, brombenzene, magnesium bromide, etc.

I have found, furthermore, that in carrying out the process it is practically essential that a small amount of water be present, preferably about 1% of water, but the best results are obtained by an amount of water of not less than .75% and not more than 2% as an amount of water above this percentage is objectionable owing to the increased pressure although it is not disadvantageous chemically. I have found that the condensation from aniline to diphenylamine could not take place in the absence of water or other substances capable of producing water under the conditions described herein. After the mixture has been digested in the autoclave 1, it is blown out through the pipe 7 into the still 9, and there distilled, three fractions being collected. The first fraction, which distils up to 200° C. consists mainly of unchanged aniline, together with a small amount of diphenylamine and is stored for re-digestion with a fresh amount of catalyst. The second fraction, distilling between 200 and 300° C. consists of a mixture of aniline with a larger amount of diphenylamine. The larger part of the latter may be recovered from this fraction by re-distillation. The main body of the diphenylamine is collected in the fraction which distils over and above 300° C. A tarry residue is left in the still from which the catalyst can be recovered.

While I have described my invention above in detail, I wish it to be understood that many changes may be made therein, without departing from the spirit of my invention.

I claim:

1. The process of condensing aniline to diphenylamine which comprises heating the aniline in the presence of water and of a catalyst comprising a substance containing bromine.

2. The process of condensing aniline to diphenylamine which comprises heating the aniline in the presence of water and of an ionizable bromide.

3. The process of condensing aniline to diphenylamine which comprises heating the aniline in the presence of water and of ammonium bromide.

4. The process of condensing aniline to diphenylamine which comprises heating aniline in a closed vessel above its normal boiling point, in the presence of water and of less than the molecular proportion of a substance containing bromine, and separating, during the reaction, ammonia which is formed.

5. The process of condensing aniline to diphenylamine which comprises heating aniline in a closed vessel above its normal boiling point, in the presence of water and of an ionizable bromide, and separating, during the reaction, ammonia which is formed.

6. The process of condensing aniline to diphenylamine which comprises heating aniline in a closed vessel above its normal boiling point, in the presence of water and of ammonium bromide, and permitting ammonia formed to escape during the reaction.

7. The process which comprises condensing aniline to diphenylamine at an elevated temperature by means of a substance containing bromine in the presence of not more than 2% of water.

8. The process which comprises condensing aniline to diphenylamine at an elevated temperature by means of an ionizable bromide in the presence of not more than 2% of water.

9. The process which comprises condensing aniline to diphenylamine at an elevated temperature by means of ammonium bromide in the presence of not more than 2% of water.

10. The process of condensing aniline to diphenylamine which comprises heating aniline in a closed vessel at a temperature above its normal boiling point, in the presence of both water and a bromide, and permitting ammonia to escape during the reaction.

11. The process of condensing aniline to diphenylamine which comprises heating aniline in a closed vessel at a temperature above its normal boiling point, in the presence of a bromide and not more than 2% of water, and permitting ammonia to escape during the reaction.

12. The process which comprises condensing aniline to diphenylamine while heated under pressure and permitting the escape of ammonia, by means of ammonium bromide in the presence of water.

13. The process which comprises condensing aniline to diphenylamine while heated under pressure and permitting the escape of ammonia, by means of ammonium bromide in the presence of not more than 2% of water.

In testimony that I claim the foregoing I have hereunto set my hand.

HOMER ROGERS.

Witnesses:
G. D. HOPKINS.
R. B. SEGAR.